United States Patent
Liu et al.

(10) Patent No.: US 11,963,534 B2
(45) Date of Patent: Apr. 23, 2024

(54) FENGYCIN FAMILY LIPOPEPTIDES IN PEST CONTROL

(71) Applicant: Institute of Biology, Hebei Academy of Sciences, Shijiazhuang (CN)

(72) Inventors: Hongwei Liu, Shijiazhuang (CN); Caimiao Yao, Shijiazhuang (CN); Yongfeng Liu, Shijiazhuang (CN); Liping Zhang, Shijiazhuang (CN); Yana Wang, Shijiazhuang (CN); Wenya Zhao, Shijiazhuang (CN)

(73) Assignee: INSTITUTE OF BIOLOGY, HEBEI ACADEMY OF SCIENCES, Shijiazhuang (CN)

( * ) Notice: Subject to any disclaimer, the term of this patent is extended or adjusted under 35 U.S.C. 154(b) by 0 days.

(21) Appl. No.: 17/989,779

(22) Filed: Nov. 18, 2022

(65) Prior Publication Data
US 2023/0082007 A1    Mar. 16, 2023

Related U.S. Application Data

(63) Continuation of application No. PCT/CN2022/085335, filed on Apr. 6, 2022.

(30) Foreign Application Priority Data

Apr. 25, 2021 (CN) .......................... 202110445482.1

(51) Int. Cl.
*A01N 63/50* (2020.01)
*A01P 7/04* (2006.01)

(52) U.S. Cl.
CPC ................ *A01N 63/50* (2020.01); *A01P 7/04* (2021.08)

(58) Field of Classification Search
CPC ........ A61K 38/15; A61K 38/12; A61K 38/02; A01C 1/08; A01C 1/06; A01P 7/04; A01N 63/50; A61N 37/46
See application file for complete search history.

(56) References Cited

U.S. PATENT DOCUMENTS 6,060,051 A      5/2000  Heins
2019/0335758 A1* 11/2019 Coutte .................. A01N 63/50

FOREIGN PATENT DOCUMENTS

| CN | 1255143 A   | 5/2000  |
| CN | 1335854 A   | 2/2002  |
| CN | 1554240 A   | 12/2004 |
| CN | 113100237 A | 7/2021  |

OTHER PUBLICATIONS

Ren et al. "Development and Application of Seed Coating Agent for the Control of Major Soil-Borne Diseases Infecting Wheat", Agronomy, 2019, 9 pages (Year: 2019).*
Xiao et al. "Activity of Fengycin and Iturin A Isolated From Bacillus subtilis Z-14 on *Gaeumannomyces graminis* Var. tritici and Soil Microbial Diversity", Frontiers in Microbiology, 2021, 14 pages (Year: 2021).*
Hu et al. "Fengycin antibiotics isolated from B-FS101 culture inhibit growth of Fusarium moniliform Sheldon ATCC 38932", FEMS Microbiol Lett, 2007, 91-98 (Year: 2007).*

* cited by examiner

*Primary Examiner* — Lianko G Garyu
(74) *Attorney, Agent, or Firm* — Kaplan Breyer Schwarz LLP; Stuart H. Mayer

(57) ABSTRACT

An application of fengycin family lipopeptides in pest control is provided, and Fengycin family lipopeptides are used for pest control, with especially strong killing effects on Homoptera and Coleoptera pests. A method is provided for treating seeds with fengycin to protect seeds and plant organs formed later from pests, so as to protect seeds from pests by coating the fengycin family lipopeptides on the surface of seeds.

8 Claims, No Drawings

FENGYCIN FAMILY LIPOPEPTIDES IN PEST CONTROL

CROSS-REFERENCE TO RELATED APPLICATIONS

This application is a continuation of PCT/CN2022/085335, filed Apr. 6, 2022 and claims priority to Chinese Patent Application No. 202110445482.1, filed on Apr. 25, 2021, the contents of which are hereby incorporated by reference as if fully rewritten herein.

TECHNICAL FIELD

The application relates to the technical field of pest control, and in particular to application of fengycin family lipopeptides in pest control.

BACKGROUND

Fengycin includes fengycin A and B and plipastatin A and B. In 1986, German and Japanese teams discovered fengycin at the same time: fengycin produced by *Bacillus subtilis* and plipastatin produced by *Bacillus cereus*. Fengycin was identified as an antifungal agent, and plipastatin was identified as an inhibitor of phospholipase A2. There is only a slight structural difference between them (Their difference lies in the conformation of the 9th amino acid-tyrosine, the L-type of fengycin and the D-type of plipastatin). Then Kim et al. confirmed that *Bacillus thuringiensis* also produced fengycin. Tosato et al. found the operon coding for fengycin or plipastatin synthetase in *Bacillus subtilis* 168, and then found the operon coding in *Bacillus subtilis* b213 and *Bacillus amyloliquefaciens* FZB42 successively.

Fengycin or plipastatin is composed of a hydrophilic cyclic peptide and a hydrophobic β-fatty acid chain. And the hydrophilic cyclic peptide is composed of 10 amino acids. At present, there are two common types: fengycin/plipastatin A and fengycin/plipastatin B. Their structural differences are reflected in the difference of amino acids at the 6th position, namely, fengycin/plipastatin A is D-alanine, while fengycin/plipastatin B is D-valine. Its polypeptide part is an internal lactone ring formed by the third tyrosine and the last L-isoleucine, and the other two amino acids are located outside the ring. The β-fatty acid chain is composed of 14-18 carbon atoms, among which unsaturated bonds may be available. Other common fengycin family lipopeptides include fengycin C and fengycin S, etc. Compared with iturins and surfactins, fengycin/plipastatin has weaker hemolysis, but have stronger antifungal activity, especially for filamentous fungi such as *Rhizoctonia solani*, so fengycin/plipastatin has been used for biological control and inhibition of plant pathogenic fungi. Recently it is found in study that fengycin/plipastatins may also induce plant immune response. In addition, there is an antibacterial synergistic effect between the pairwise combinations of different types of lipopeptides, such as surfactins, iturins and fengycin.

Pest control is a very important part of agricultural production, and plays a key role in ensuring food production and food safety. In recent years, influenced by many factors, such as global climate change, change of farming mode, adjustment of industrial structure and increasing frequency of biological invasion brought by international trade exchange, the occurrence species and damage rules of agricultural pests in China have also changed obviously, and the control of agricultural pests is facing new challenges.

Chemical control is widely adopted at present, but the problems of pesticide residues and biological resistance caused by long-term use of chemical pesticides have become increasingly prominent. In recent years, with people's growing concern for environmental ecology and food safety, it has been an inevitable trend to develop eco-friendly new pesticides. However, at present, the research on fengycin family lipopeptides mainly is focused on their antibacterial activity, and there is no relevant report on using fengycin family lipopeptides to control pests.

SUMMARY

The purpose of the present application is to provide application of fengycin family lipopeptides in pest control, so as to solve the problems existing in the prior art mentioned above and provide an eco-friendly pesticide.

To achieve the above objective, the present application provides the following technical schemes:

On one hand, application of fengycin family lipopeptides in pest control is provided.

In some embodiments, the fengycin family lipopeptides are one of or a mixture of two or more of fengycin A, fengycin B, fengycin C, fengycin S, plipastatin A and plipastatin B.

In some embodiments, the pests are HOMOPTERA pests or COLEOPTERA pests.

In some embodiments, the HOMOPTERA pests are one or more of *Aphis craccivora* Koch, *Aphis gossypii*, *Brevicoryne brassicae* and *Macrosiphum avenae*.

In some embodiments, the COLEOPTERA pests are one or more of *Protaetia brevitarsis*, *Holotrichia parallela*, *Anomala corpulenta* and *Polyphylla gracilicornis*.

In some embodiments, the application is to prepare the fengycin family lipopeptides into liquid and then treat plants or soil to control pests.

On the other hand, a method for protecting seeds and later formed plant organs from pests is provided, including treating seeds with the fengycin family lipopeptides.

In some embodiments, the mass concentration of the fengycin family lipopeptides is 0.1-100 μg/mL.

In some embodiments, the seeds are coated with a coating agent containing the fengycin family lipopeptides.

In some embodiments, the coating agent further includes a film forming agent or an adhesive.

The present application discloses the following technical effects:

The present application discloses a new application of fengycin in pest control. Experiments have proven that fengycin has obvious insecticidal activity against aphids, grubs and other pests, and its insecticidal effect may reach more than 95% in 24 hours, so fengycin may be applied to the control of agricultural pests.

DETAILED DESCRIPTION OF THE EMBODIMENTS

Now various exemplary embodiments of the present application will be described in detail. This detailed description should not be taken as a limitation of the present application, but should be understood as a more detailed description of some aspects, characteristics and embodiments of the present application.

It should be understood that the terms mentioned in the present application are only used to describe specific embodiments, and are not used to limit the present application. In addition, for the numerical range in the present application, it should be understood that each intermediate value between the upper limit and the lower limit of the range is also specifically disclosed. Every smaller range between any stated value or the intermediate value within the stated range and any other stated value or the intermediate value within the stated range is also included in the present application. The upper and lower limits of these smaller ranges can be independently included or excluded from the range.

Unless otherwise stated, all technical and scientific terms used herein have the same meanings commonly understood by those of ordinary skill in the field to which this application relates. Although the present application only describes preferred methods and materials, any methods and materials similar or equivalent to those described herein can be used in the practice or testing of the present application. All documents mentioned in this specification are incorporated by reference to disclose and describe the methods and/or materials related to the documents. In case of conflict with any incorporated documents, the contents of this specification shall prevail.

Without departing from the scope or spirit of the present application, it is obvious to those skilled in the art that many modifications and changes may be made to the specific embodiments of the present specification. Other embodiments obtained from the description of the present application will be obvious to the skilled person. The description and embodiment of that application are only exemplary.

Unless otherwise specified, the experimental methods used in the embodiments are conventional experimental methods in the field; Materials and reagents used in the embodiments can be obtained from commercial sources unless otherwise specified.

Embodiment 1

Preparation of Fengycins
Bacillus amyloliquefaciens WS-8 (preservation number: CGMCC No. 11787) is used for fermentation to prepare fengycins. The specific steps are as follows:
- S1, carrying out amplification culture on the bacterial strain to obtain fermentation liquor;
- S2, centrifuging the fermentation liquor to remove thallus to obtain sterile supernatant;
- S3, adding amberlity XAD-7HP macroporous resin to the sterile supernatant for adsorption, and shaking at 4° C. for 12 hours;
- S4, filtrating and collecting the resin, washing it with distilled water for three times, then with 60% ethanol (volume/volume), and concentrating the eluent to obtain a crude extract;
- S5, using high performance liquid chromatography for further purification, including, loading mobile phase A, which is acetonitrile containing 0.1% (volume ratio) trifluoroacetic acid, and mobile phase B, which is ultrapure water containing 0.1% (volume ratio) trifluoroacetic acid, into WondaSil C18 (4.6 mm×150 mm) chromatographic column with a particle size of 5 μm, using 10%-90% acetonitrile for linear gradient elution with the flow rate 1 mL/min, detecting the wavelength as 214 nm and the column temperature as 30° C., collecting the components corresponding to 30-50 min, and using the mass spectrometry (Table 1) to confirm that fengycins are obtained.

TABLE 1

Mass spectrometry detection results of purified products

| Compound serial number | m/z [M + H]+ | m/z [M + Na]+ | Characteristic fragmention | Determination result |
| --- | --- | --- | --- | --- |
| 1 | 1435.7660 | 1457.7474 | 540.77 | $C_{14}$ Fengycin A |
| 2 | 1449.7848 | 1471.7635 | 540.77 | $C_{15}$ Fengycin A |
| 3 | 1463.7975 | 1485.7784 | 554.79 | $C_{14}$ Fengycin B |
| 4 | 1449.7836 | 1471.7632 | 540.77 | $C_{15}$ Fengycin A |
| 5 | 1449.7816 | 1471.7626 | 540.77 | $C_{15}$ Fengycin A |
| 6 | 1477.8138 | 1499.7944 | 554.79 | $C_{15}$ Fengycin B |
| 7 | 1463.7969 | 1485.7777 | 540.77 | $C_{16}$ Fengycin A |
| 8 | 1463.7974 | 1485.7789 | 540.77 | $C_{16}$ Fengycin A |
| 9 | 1477.8138 | 1499.7888 | 540.77 | $C_{17}$ Fengycin A |
| 10 | 1477.8140 | 1499.7932 | 540.77 | $C_{17}$ Fengycin A |
| 11 | 1477.8157 | 1499.7963 | 540.77 | $C_{17}$ Fengycin A |
| 12 | 1491.8285 | 1513.8091 | 554.79 | $C_{16}$ Fengycin B |
| 13 | 1505.8439 | 1527.8250 | 554.79 | $C_{17}$ Fengycin B |
| 14 | 1447.8036 | 1469.7852 | 540.77 | $C_{15:1}$ Fengycin A |
| 15 | 1461.8197 | 1483.8000 | 540.77 | $C_{16:1}$ Fengycin A |
| 16 | 1475.8328 | 1497.8135 | 554.79 | $C_{15:1}$ Fengycin B |

Embodiment 2

Insecticidal Effect of the Fengycins on HOMOPTERA Insects

Dissolving the fengycins in methanol to prepare 200 μg/mL mother liquor, and then diluting the mother liquor with water to 5 μg/mL, 10 μg/mL and 20 μg/mL liquid medicine, and using clean water treatment as a control; soaking young broad bean stems in insecticidal experiment of Aphis craccivora Koch, young cotton stems in insecticidal experiment of Aphis gossypii, young cabbage leaves in insecticidal experiment of Brevicoryne brassicae, young stems of wheat in insecticidal experiment of Macrosiphum avenae, soaking the young broad bean stems, the young cotton stems, the young cabbage leaves and the young stems of wheat in the above-mentioned liquid medicine for 10 minutes, then absorbing water with filter paper, taking them out, putting them in a plate with filter paper, adding 2 mL of deionized water to keep moisture, then covering the plate with fresh-keeping film, puncturing holes, and adding 1 mL of water every 12 hours; testing 50 aphids in each concentration respectively, repeating for 3 times, using a brush head to pick 50 aphids of each species with similar age and size, putting them on the plate to starve for 4 hours, then adding the young broad bean stems, the young cotton stems, the young cabbage leaves and the young wheat stems treated with the above-mentioned liquid medicine onto the plate respectively, changing every 12 hours, culturing overnight in an incubator at 25° C., recording the number of aphids killed, and calculating the mortality rates of aphids at different dilution ratios.

$$\text{The mortality rate} = \frac{\text{the number of aphids killed}}{\text{the number of aphids for testing}} \times 100\%$$

Measuring the mortality rates of the aphids: After the aphids are treated overnight, touching the aphids with a brush head, and if the aphid does not move, it is regarded as dead. Count and record the number of dead aphids. It can be seen from the implementation data results in Table 2 that the fengycins have a good control effect on Homoptera insects.

TABLE 2

Control effect of the fengycins on Homoptera insects

| Processing group | Mortality rate (%) | | | |
|---|---|---|---|---|
| | *Aphis craccivora* Koch | *Aphis gossypii* | *Brevicoryne brassicae* | *Macrosiphum avenae* |
| CK | 2.00 | 1.33 | 1.33 | 2.00 |
| 5 μg/mL | 86.00 | 87.33 | 82.00 | 84.00 |
| 10 μg/mL | 94.00 | 94.00 | 91.33 | 91.33 |
| 20 μg/mL | 100.00 | 98.67 | 99.33 | 98.67 |

Embodiment 3

Insecticidal Effects of the Fengycins on Coleoptera Insects

Dissolving the fengycins in methanol to prepare 200 μg/mL mother liquor, and then diluting the mother liquor with water to prepare 5 μg/mL, 10 μg/mL and 20 μg/mL liquid medicine, using the liquid medicine to prepare medicine soil, with the mass ratio of the liquid medicine to soil 1:5, and using medicine soil that prepared with clean water treatment as a control. Using chopped peanuts as food. Using plastic buckets with a capacity of 4 L as containers, and placing 2 L of evenly mixed medicinal soil in each bucket, and adding a proper amount of equal food to mix well. Adopting a medicinal soil method, selecting the grubs of the third instar larvae of *Protaetia brevitarsis, Holotrichia parallela, Anomala corpulenta* and *Polyphylla gracilicornis* with the same size, and keeping them in the environment with relative humidity of 50%-70% and temperature of 25° C.-28° C. for 24 hours. Treating 15 third instar larvaes with the different medicine soil prepared above respectively, repeating for 3 times. After inoculating the larvaes, culturing them indoors at normal atmospheric temperature, and counting the mortality rate after 56 hours, as shown in Table 3.

TABLE 3

Killing effect of the fengycins on different COLEOPTERA larvaes

| Processing group | Mortality rate (%) | | | |
|---|---|---|---|---|
| | *Protaetia brevitarsis* | *Holotrichia parallela* | *Anomala corpulenta* | *Polyphylla gracilicornis* |
| CK | 0.00 | 0.00 | 0.00 | 0.00 |
| 5 μg/mL | 82.22 | 80.00 | 82.22 | 80.00 |
| 10 μg/mL | 88.89 | 91.11 | 88.89 | 86.67 |
| 20 μg/mL | 97.78 | 95.56 | 93.33 | 95.56 |

Embodiment 4

Dissolving the fengycins in methanol to prepare 200 μg/mL mother liquor, and then diluting the mother liquor with water into 0.1 μg/mL, 0.5 μg/mL, 1 μg/mL, 5 μg/mL, 10 μg/mL, 20 μg/mL, 50 μg/mL and 100 μg/mL liquid medicine to soak peanuts, and using peanuts that soaking in clean water as a control. Using plastic buckets with a capacity of 4 L as containers, and placing 2 L of evenly mixed soil in each bucket, and adding 50 treated peanuts to mix well. Selecting the grubs of the third instar larvae of *Holotrichia parallela* with the same size, and keeping them in the environment with relative humidity of 50%-70% and temperature of 25° C.-28° C. for 24 hours. Repeating the treatment for 3 times. The number of each test insect in each treatment is 15, repeating the treatment for 3 times. After inoculating the larvaes, culturing them indoors at normal atmospheric temperature, and counting the mortality rate of the larvaes and integrity rate of the peanuts after 56 hours, as shown in Table 4.

TABLE 4

Insecticidal and protective effects of epiploin on seeds

| Processing group | Mortality rate (%) | Peanut intactness rate (%) |
|---|---|---|
| CK | 0.00 | 8 |
| 0.1 μg/mL | 53.33 | 47.33 |
| 0.5 μg/mL | 64.44 | 52.00 |
| 1 μg/mL | 75.56 | 56.00 |
| 5 μg/mL | 86.67 | 62.00 |
| 10 μg/mL | 95.56 | 74.00 |
| 20 μg/mL | 97.78 | 76.67 |
| 50 μg/mL | 100.00 | 79.33 |
| 100 μg/mL | 100.00 | 81.33 |

The above are only preferred embodiments of the present application, and are not intended to limit the present application. On the premise of not departing from the design spirit of the present application, all kinds of modifications and improvements made by ordinary technicians in the field to the technical schemes of the present application should fall in the scope of protection defined by the claims of the present application.

What is claimed is:

1. A method for controlling pests, the method comprising contacting the pests with a fengycin family lipopeptides mixture consisting of a fengycin A and fengycin B wherein the pests are Homoptera pests or Coleoptera pests.

2. The method according to claim 1, wherein the Homoptera pests are one or more of *Aphis craccivora* Koch, *Aphis gossypii, Brevicoryne brassicae* and *Macrosiphum avenae*.

3. The method according to claim 1, wherein the Coleoptera pests are one or more of *Protaetia brevitarsis, Holotrichia parallela, Anomala corpulenta* and *Polyphylla gracilicornis*.

4. The method according to claim 1, wherein the mixture is in a liquid form to treat plants or soil to control pests.

5. The method according to claim 1, for protecting seeds and later-formed plant organs from pests.

6. The method according to claim 5, wherein a mass concentration of the fengycin family lipopeptides mixture is 0.1-100 μg/milliliter (ml.).

7. The method according to claim 5, wherein the seeds are coated with a coating agent containing the fengycin family lipopeptides mixture.

8. The method according to claim 7, wherein the coating agent further comprises a film forming agent or an adhesive.

* * * * *